(12) United States Patent
Guo et al.

(10) Patent No.: US 8,650,631 B2
(45) Date of Patent: Feb. 11, 2014

(54) SERVER PROTECTION FROM DISTRIBUTED DENIAL OF SERVICE ATTACKS

(75) Inventors: Wei Hua Guo, Beijing (CN); Tian Chen, Beijing (CN); Chaohua Wan, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 881 days.

(21) Appl. No.: 12/421,962

(22) Filed: Apr. 10, 2009

(65) Prior Publication Data
US 2010/0235902 A1  Sep. 16, 2010

(30) Foreign Application Priority Data
Mar. 13, 2009  (CN) .......................... 2009 1 0127134

(51) Int. Cl.
*G06F 9/00*  (2006.01)
*G06F 15/16*  (2006.01)
*G06F 17/00*  (2006.01)
*G06F 7/04*  (2006.01)
*G06F 17/30*  (2006.01)
*H04L 29/06*  (2006.01)

(52) U.S. Cl.
USPC ..................... 726/12; 726/2; 726/4; 726/14

(58) Field of Classification Search
USPC ............................ 726/12, 2, 4, 14
See application file for complete search history.

(56) References Cited

U.S. PATENT DOCUMENTS

| | | | |
|---|---|---|---|
| 5,941,988 A * | 8/1999 | Bhagwat et al. | 726/12 |
| 7,478,425 B2 * | 1/2009 | Kanno et al. | 726/12 |
| 7,664,855 B1 * | 2/2010 | Freed et al. | 709/225 |
| 7,908,472 B2 * | 3/2011 | Freed et al. | 713/150 |
| 2007/0192845 A1 * | 8/2007 | Lankheim | 726/12 |
| 2008/0126794 A1 * | 5/2008 | Wang et al. | 713/151 |
| 2008/0189781 A1 * | 8/2008 | Pathak et al. | 726/12 |
| 2009/0106830 A1 * | 4/2009 | Maher | 726/12 |
| 2009/0133113 A1 * | 5/2009 | Schneider | 726/12 |
| 2009/0165105 A1 * | 6/2009 | Chaudhry | 726/7 |

* cited by examiner

*Primary Examiner* — Edan Orgad
*Assistant Examiner* — Jahangir Kabir
(74) *Attorney, Agent, or Firm* — Harrity & Harrity, LLP

(57) ABSTRACT

A network device connects between a client and a server. The network device is configured to store information regarding an application operating on the server; receive a first message, from the client, intended for the server; generate a second message in response to the first message; send the second message to the client; receive a third message from the client; generate, based on the information regarding the application on the server, a fourth message, that includes the information regarding the application operating on the server; send the fourth message to the client; receive a service request from the client in response to the fourth message; and establish, based on the service request, a connection between the client and the server.

20 Claims, 6 Drawing Sheets

SERVER PROTECTION FROM DISTRIBUTED DENIAL OF SERVICE ATTACKS

BACKGROUND

Servers that provide peer-to-peer (P2P) network services using Transmission Control Protocol (TCP) services are often susceptible to various types of Denial of Service (DoS) attacks, including Distributed Denial of Service (DDoS) attacks, from external hosts on the network. As the number of peers, or clients, in a P2P system increases—often to numbers exceeding tens of thousands—the risk of a DDoS attack also increases. In a typical DDoS attack, an attacking client may poison a centralized index table in a P2P system central server. Alternatively, an attacking client may poison distributed index tables in distributed servers. Innocent P2P clients use the information from the poisoned index tables to attack servers within the P2P system.

In one particular type of attack, known as a "synchronization (SYN) flood," external hosts overwhelm the server by sending a constant stream of TCP connection requests to the server, which forces the server to allocate resources for each new connection until all of the server's resources are exhausted. In the case of a poisoned index table, the P2P system clients are inadvertent participants in the SYN flood attack.

Firewalls are often used to protect servers from being susceptible to a SYN flood attack. One technique that firewalls use to protect servers is called a "SYN cookie." For each incoming synchronization (SYN) packet (or message), the firewall replies with a SYN/ACK packet (or message) with a particular signature in an Initial Sequence Number (ISN) (called a SYN cookie). The firewall will permit a TCP connection request to proceed to the server only if the ACK packet (or message) that the firewall receives from the client contains the correct signature. However, in the example of a poisoned index table, the inadvertent attack from a spoofed Internet Protocol (IP) address will appear to contain the correct signature. As a result, in such circumstance, the firewall might permit the TCP connection to reach the server, thereby subjecting the server to a DDoS attack.

SUMMARY

According to one implementation, a device may connect between a client and a server. The device may include a memory to store a number of records, where one of the records may include information regarding an application operating on the server. The network device may also include a processor, connected to the memory, to receive a first message from the client, intended for the server; generate a second message in response to the first message; send the second message to the client; receive a third message from the client; access the memory, in response to the third message, to obtain the information regarding the application operating on the server; generate, in response to the information obtained, a fourth message, that includes information regarding the application operating on the server; send the fourth message to the client; receive a service request from the client in response to the fourth message; and establish, based on the service request, a connection between the client and the server.

According to another implementation, a method may include storing, in a memory, information regarding an application operating on a server; intercepting, from a client and over a network, a synchronization (SYN) message intended for the server; identifying, from the memory, the information regarding the application operating on the server; generating a SYN/acknowledgment (ACK) (SYN/ACK) message; transmitting the SYN/ACK packet to the client; receiving an ACK packet from the client over the network; identifying, from the memory, the information regarding the application operating on the server; generating an application ACK message, that includes the information regarding the application operating on the server; transmitting the application ACK packet to the client; receiving a service request from the client in response to the fourth message; and determining whether to establish a connection between the client and the server based on the service.

According to a further implementation, a network device, connected between a client and a server, may include means for monitoring information provided by the server during a three-way handshake; means for storing the information as information regarding an application operating on the server; means for receiving, from the client, a request to establish a connection with the server; means for performing, on behalf of the server, a three-way handshake with the client, means for transmitting an application ACK packet to the client, where the information regarding the application operating on the server is provided in the application ACK message, means for receiving a service request from the server, in response to the application ACK message, means for performing a three-way handshake with the server when the three-way handshake with the client is successful, means for forwarding the service request to the server; and means for establishing the connection between the client and the server based on the service request.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

Implementations, described herein, may facilitate a data connection between a client and a server while protecting the server from DDoS attacks. These implementations will be described in terms of a TCP connection—though the description may apply to connections established using other types of protocols, such as User Datagram Protocol (UDP). The description may also apply to protocols that may be employed in P2P networks, such as eMule, BitTorrent, BitSprit; and furthermore, the description may apply to server protocols, including hypertext transfer protocol (http), hypertext transfer protocol secure (https), secure socket shell (SSH), telecommunication network (Telnet), file transfer protocol (FTP), and versions of post office protocol (POP).

Figure 1:
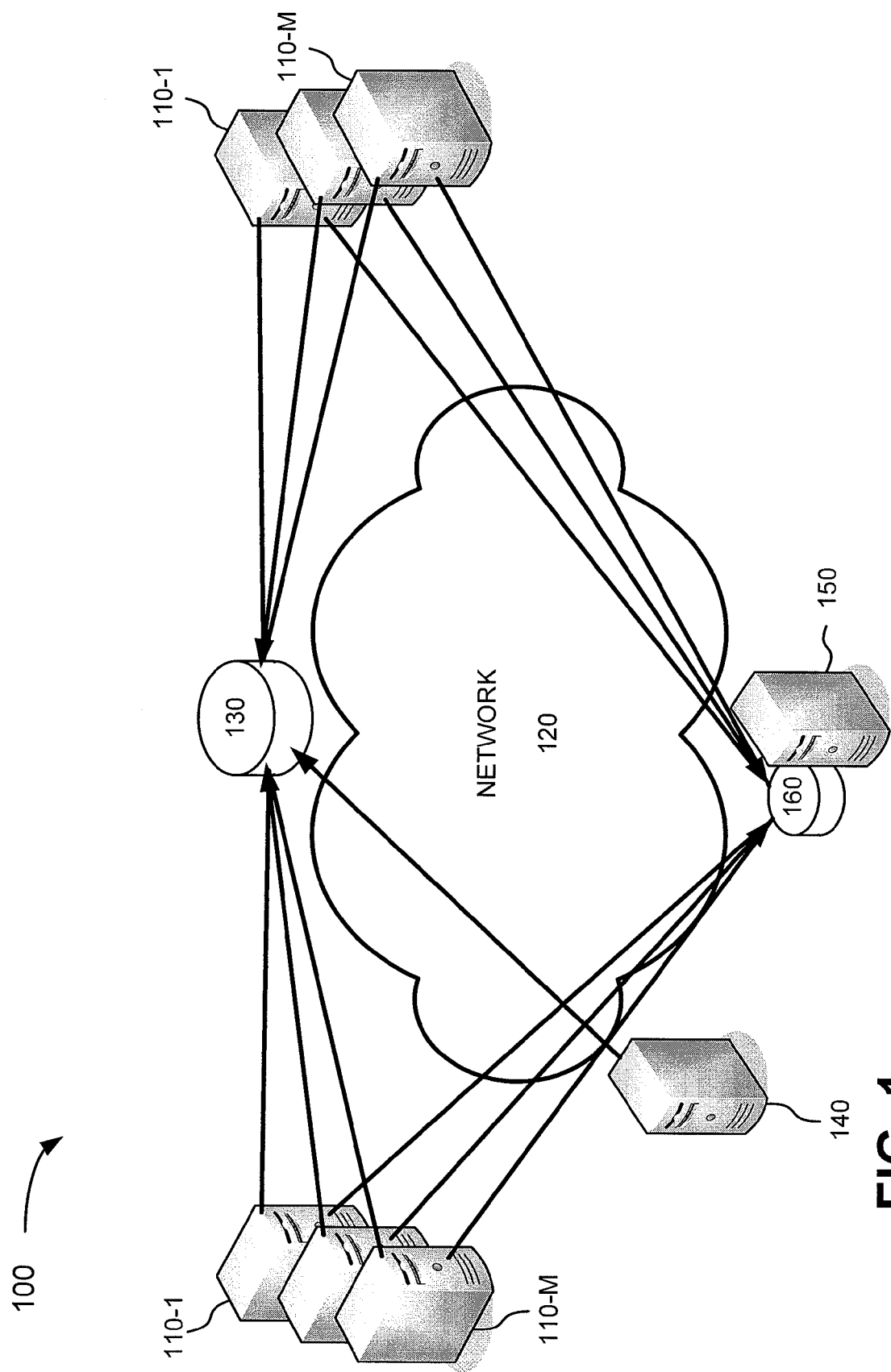
FIG. 1 is a diagram of an exemplary environment in which systems and methods, described herein, may be implemented.

FIG. 1 is a diagram of an exemplary P2P environment 100 in which systems and methods, described herein, may be implemented. Environment 100 may include multiple clients 110-1, . . . , 110-M (where M≥1) (referred to collectively as "clients 110," and individually as "client 110") connected to each other in a peer-to-peer network operating over a network 120, index table 130, attacker 140, application server 150, and server application 160. While FIG. 1 shows a particular number and arrangement of devices, environment 100 may include additional, fewer, different, and/or differently arranged devices in other implementations.

Client 110 may include a computing or communication device of an end-user, such as a desktop computer, a laptop, or a mobile communication device (e.g., a mobile phone or a personal digital assistant (PDA)). Network 120 may include any type of network, such as the Internet, an ad hoc network, a local area network (LAN), a wide area network (WAN), a metropolitan area network (MAN), a telephone network (e.g., a wireless communication network or the public switched telephone network (PSTN)), or a combination of networks. Index table 130 may be any table or list of information relevant to the operation of the P2P network, including a database, a spreadsheet, a table, or a linked list. Index table 130 may be a centralized index table, such as one that may be resident on a network server, or index table 130 may be a distributed index table, such as one that may be resident in one or more clients 110. Clients 110 may connect to index table 130 via wired and/or wireless connection(s).

Attacker 140 may include a computing or communication device of an end-user, such as a desktop computer, a laptop, or a mobile communication device (e.g., a mobile phone or a personal digital assistant (PDA)). Application server 150 may be an applications server that may execute one or more server applications 160 that a client can request. Server application 160 may be any specific program, software, and/or content that may be accessed by clients 110. Clients 110, attacker 140, and application server 150 may connect to P2P environment 100 via wired and/or wireless connection(s).

In the operation of P2P environment 100, a client 110 may communicate with another client 110 and/or multiple clients 110. Typically, P2P transmissions use a transmission protocol designed for P2P networks, such as eMule, BitTorrent, or BitSprit. Specific transmission protocols may be associated with specific data patterns. In one implementation, clients 110 may also communicate with one or more applications servers, including application server 150. Client-server communication may be conducted with server protocols, including http, https, SSH, Telnet, FTP, and versions of POP. Specific server protocols may be associated with specific data patterns. Clients 110 may acquire application-specific data, content-specific data, and/or user-specific data from index table 130. In one implementation, index table 130 may include keywords, IP addresses, and source and/or destination port numbers. For example, a specific keyword may identify a specific P2P client's content, and the IP address and port numbers may be used by other P2P clients to access the specific content.

Attacker 140 may also access index table 130. In one implementation, attacker 140 may "poison" the index table by placing data in the index table that may cause many clients 110 to overload server 150 (hereinafter "victim server 150"). For example, attacker 140 may place information in index table 130 that many P2P clients will wish to access. For this example, assume that attacker 140 places an entry in index table 130 that identifies image content of a popular celebrity. Assume further that the index table entry for that specific celebrity image content identifies the IP address and port data for victim application server 150. For this example, assume that neither victim server 150 nor server application 160 have the content identified by the index table entry placed by attacker 140. If the "poisonous" index table entry is accessed by many clients 110, those clients 110 may innocently overload victim server 150 with multiple attempts to access the content identified in the poisoned index table entry. Besides content, such as celebrity images, other applications may be targets of attacks by attacker 140. Examples of such other applications may include live sports or news reporting, software applications, and music and/or video signals. In order to protect servers from DDoS attacks in environments such as P2P environment 100, a firewall (not shown) may be installed and/or operated at each server. For example, a firewall may permit the establishment of connections between clients 110 and victim server 150, while simultaneously providing protection from DDoS attack.

To facilitate an understanding of the description herein, it may be beneficial to describe generally the establishment of a TCP connection between a client and a server via a firewall. During establishment of a TCP connection, the firewall may operate in one of two modes depending, for example, on the number of connections sought with the server. The first mode is referred to herein as a "normal mode" in which TCP connections are established freely with the server. The second mode is referred to herein as an "attack mode" in which TCP connections are scrutinized before establishing the connections with the server, as may be particularly useful in a P2P environment with a large number of clients.

Figure 2:
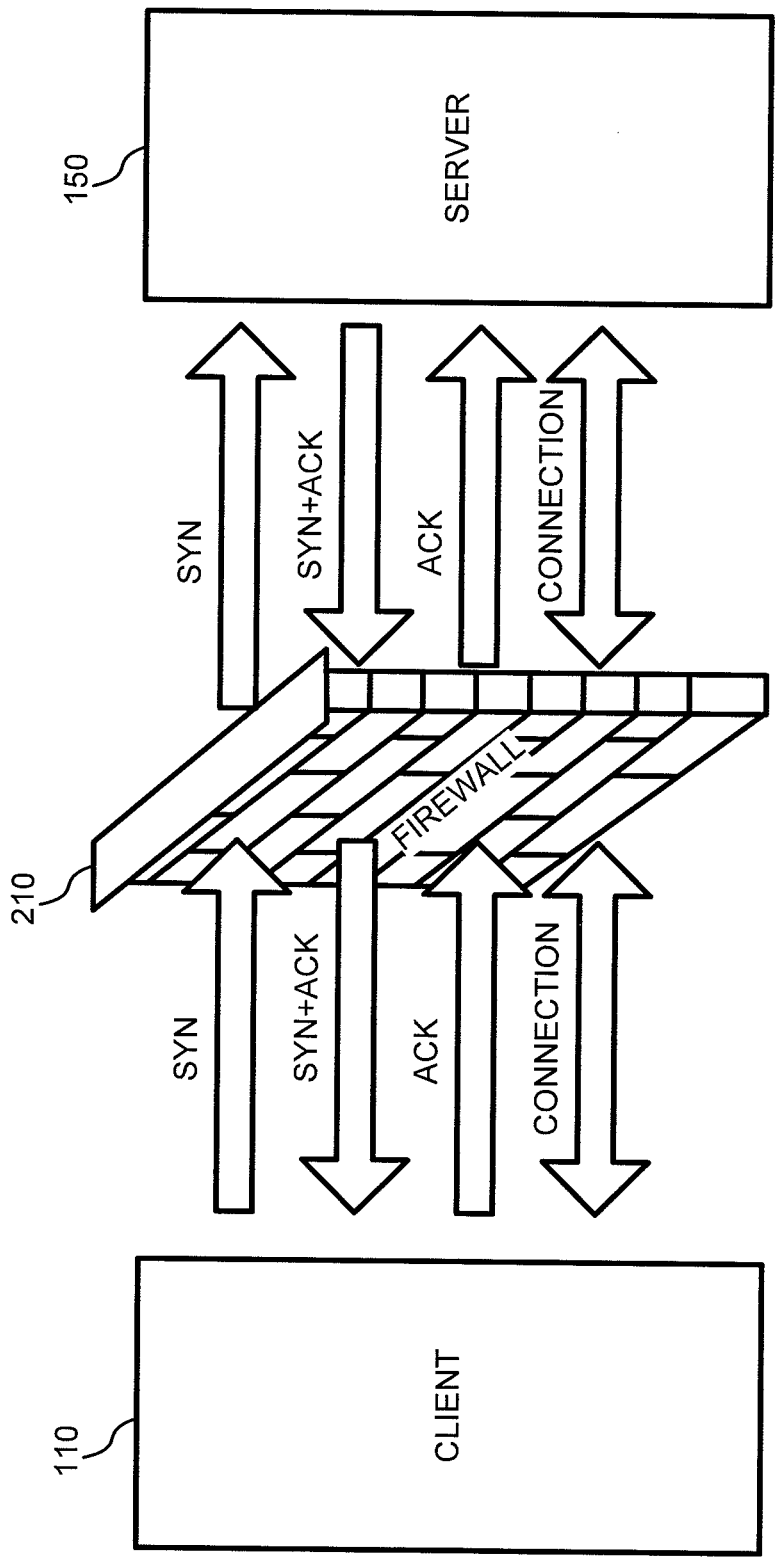
FIG. 2 is a diagram illustrating an example of setting up a TCP connection during a normal mode.

FIG. 2 is a diagram illustrating an example of setting up a TCP connection during the normal mode. As shown in FIG. 2, assume that a client 110 wants to establish a TCP connection with application server 150. Client 110 may initiate a TCP connection by sending, to the application server 150, a synchronization (SYN) packet that includes a sequence number set to a random number x. Firewall 210 may intercept the SYN packet and forward the SYN packet to application server 150. Application server 150 may record the sequence number x and reply with an acknowledgment (ACK) and SYN packet (SYN/ACK). The ACK may include the next sequence number that application server 150 expects to receive from client 110 (e.g., x+1). The SYN, from application server 150, may include its own sequence number y. Firewall 210 may intercept the SYN/ACK packet and forward the SYN/ACK packet to client 110. Client 110 may respond to the SYN/ACK packet with an ACK packet that includes the next sequence number x+1, and an acknowledgment number of y+1. Firewall 210 may intercept the ACK packet and forward the ACK packet to application server 150. The combination of the SYN, SYN/ACK, and ACK is commonly referred to as a "three-way handshake." The three-way handshake is used to establish a TCP connection between client 110 and application server 150.

Figure 3:
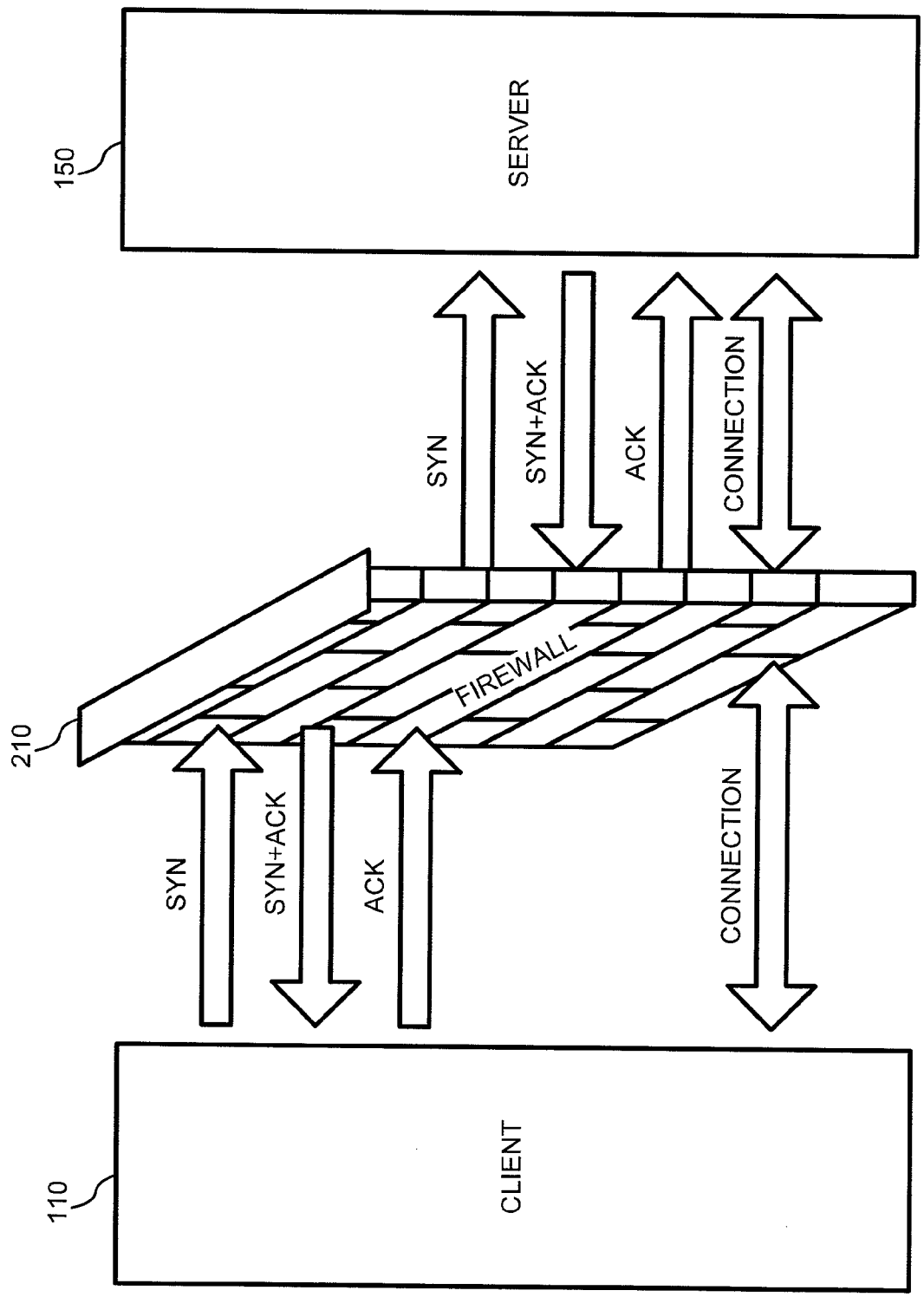
FIG. 3 is a diagram illustrating an example of setting up a TCP connection during an attack mode.

FIG. 3 is a diagram illustrating an example of setting up a TCP connection during an attack mode. As shown in FIG. 3, assume that a client 110 wants to communicate with a server. Client 110 may initiate a TCP connection by sending, to application server 150, a SYN packet that includes a sequence number set to a random number x. Firewall 210 may intercept the SYN packet and store the random number x. Firewall 210 may initiate a SYN cookie process to calculate a particular signature for the initial sequence number (ISN). Firewall 210 may generate a SYN/ACK packet that includes the particular signature as the ISN, and may send the SYN/ACK packet to client 110. Client 110 may respond to the SYN/ACK packet with an ACK packet that includes the next sequence number x+1, and an acknowledgment number of ISN+1.

Firewall 210 may intercept the ACK packet and analyze the ACK packet to determine whether the ACK packet includes the correct sequence and acknowledgment numbers. If these numbers are what firewall 210 expected to receive, firewall 210 may initiate a TCP connection with application server 150 by sending, to application server 150, a SYN packet that includes a sequence number set to a random number x. Application server 150 may receive the SYN packet and store the random number x. Application server 150 may reply to the SYN packet with a SYN/ACK packet. The ACK may include the next sequence number that application server 150 expects to receive (e.g., x+1). The SYN, from application server 150, may include its own sequence number y. Firewall 210 may receive the SYN/ACK packet and respond to the SYN/ACK packet with an ACK packet that includes the next sequence number x+1, and an acknowledgment number of y+1. As a result of this three-way handshake, a TCP connection may be established between client 110 and application server 150.

During the three-way handshake, the client expects to receive information regarding the capabilities of the server so that the client does not send data that the server is incapable of handling. If the server receives data that the server is incapable of handling, the server may deny or drop the TCP connection. Thus, it would be beneficial for the firewall to convey to the client, on behalf of the server, the capabilities of the server during the three-way handshake.

Existing firewalls reply to client SYN packets, on behalf of the servers, without knowing the capabilities of the servers that the firewalls protect. Implementations, described herein, may accumulate information, within a firewall, regarding the capabilities of the server(s) that the firewall protects. As a result, the firewall may include information regarding a server's capabilities in the three-way handshake with a client seeking to establish a TCP connection with the server. So when the client later communicates with the server, the client may send only that data that the server is capable of handling.

Figure 4:
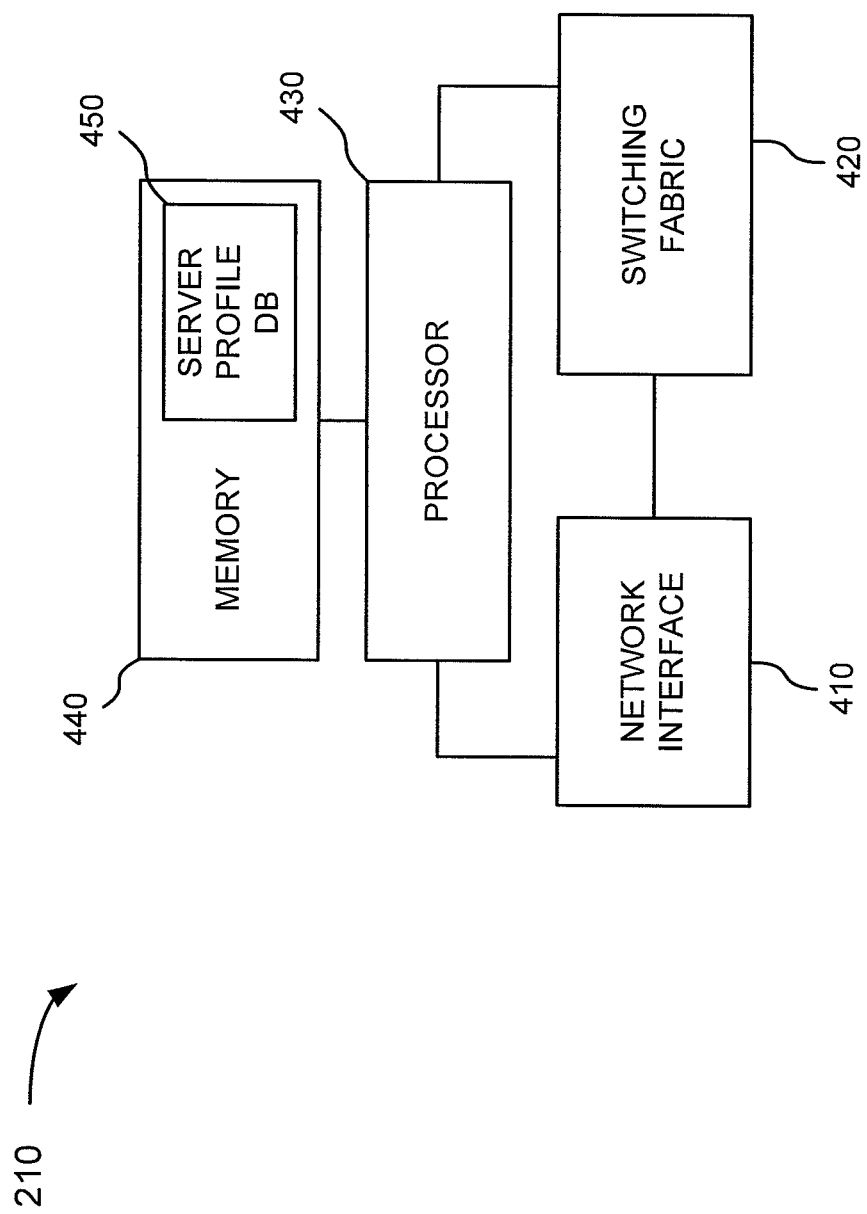
FIG. 4 is a diagram of exemplary components of the firewall of FIG. 3.

FIG. 4 is a diagram of exemplary components of firewall 210. As shown in FIG. 4, firewall 210 may include a network interface 410, a switching fabric 420, a processor 430, and a memory 440. In another implementation, firewall 210 may include additional, fewer, different, or differently arranged components than are shown in FIG. 4.

Network interface 410 may include an interface to network 120. Network interface 410 may include components for processing and/or buffering data units received from network 120 or for transmission to network 120. The term "data unit," as used herein, may refer to a packet, a datagram, or a cell; a fragment of a packet, a datagram, or a cell; or another type or arrangement of data. In one implementation, network interface 410 may connect to a set of Ethernet links.

Switching fabric 420 may include a switching plane that may facilitate the transmission of data units to/from network interface 410. For example, switching fabric 420 may include a crossbar switch. In another implementation, switching fabric 420 may include a memory device. In this case, data units, received by network interface 410, may be stored in the memory device and read from the memory device for transmission by network interface 410, and vice versa.

Processor 430 may include a processor, a microprocessor, or processing logic (e.g., an application specific integrated circuit (ASIC) or a field programmable gate array (FPGA)) that may interpret and execute instructions. Processor 430 may process data units using, for example, a set of rules that may be stored in memory 440.

Memory 440 may include a random access memory (RAM) or another type of dynamic storage device that may store information and instructions for execution by processor 430; a read only memory (ROM) or another type of static storage device that may store static information and instructions for use by processor 430; and/or a removable memory, such as a flash memory. In one implementation, memory 440 may store a set of rules that may be executed by processor 430 to determine whether to permit a client to access application server 150.

Memory 440 may include a server profile database 450. Server profile database 450 may store information regarding the capabilities of application server 150. In one implementation, server profile database 450 may include a table that includes information related to the specific application(s) operating on application server 150. For example, server profile database 450 may include a table that contains information linking an application to an associated transmission protocol.

Exemplary Firewall Operating Mode

Figure 5:
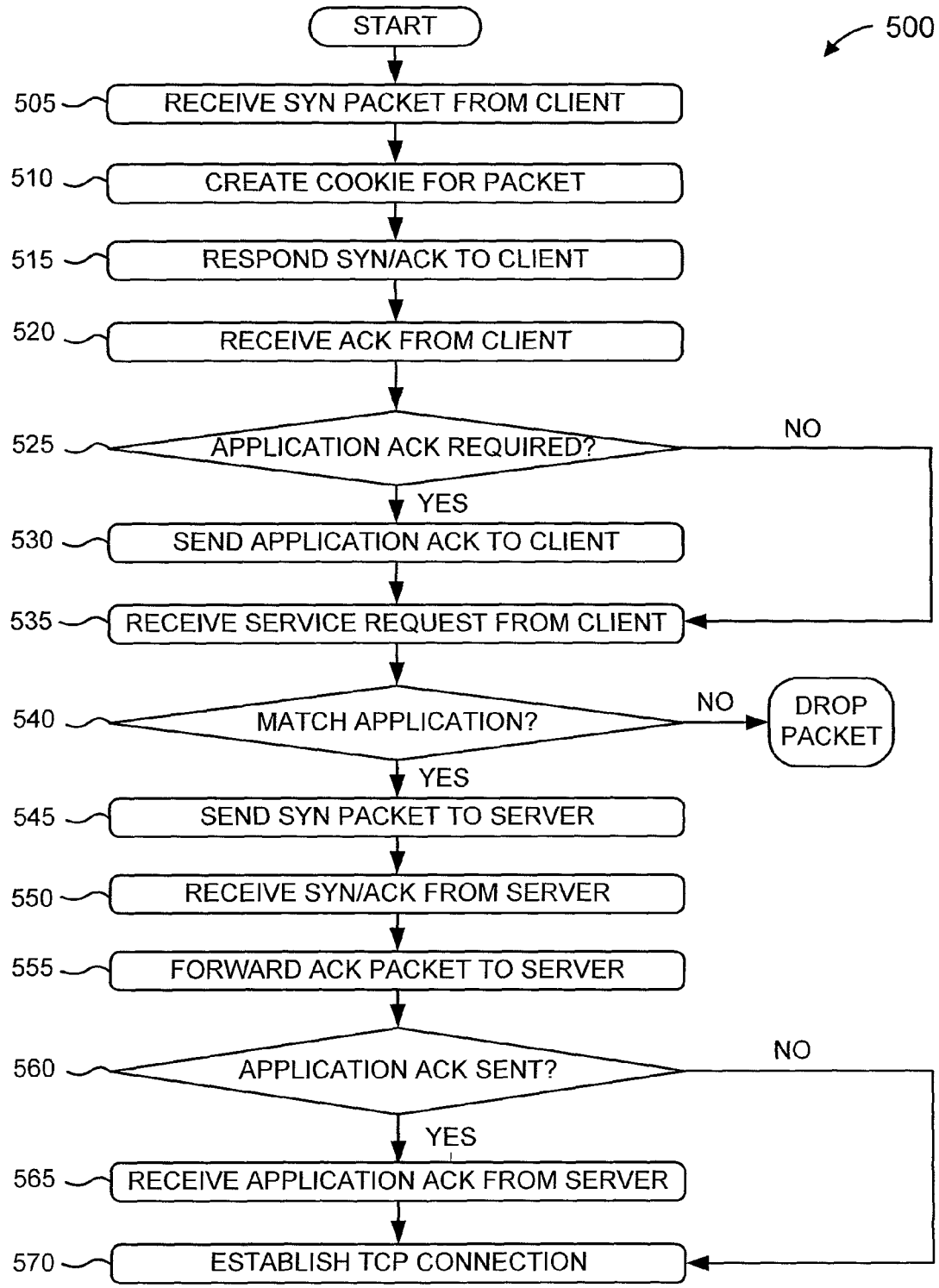
FIG. 5 provides a flowchart illustrating an exemplary process for establishing a TCP connection.

FIG. 5 provides a flowchart illustrating an exemplary process 500 for protection of an application server, particularly from distributed denial of service attacks in a P2P environment. Process 500 may be performed by a firewall (e.g., firewall 210), a group of firewalls, or a device operating in conjunction with a firewall or a group of firewalls. Process 500 may be performed by a firewall operating in attack mode.

As shown in FIG. 5, process 500 may begin with a SYN packet being received (block 505). For example, client 110 may generate a SYN packet for establishing a TCP connection with application server 150. Client 110 may send the SYN packet to application server 150. In one implementation, client 110 may send the SYN packet to application server 150, to initiate a process of requesting access to, and/or service from, application 160. Firewall 210 may intercept the SYN packet.

Upon receipt of the TCP SYN packet from client 110, firewall 210 may create a cookie for the packet (block 510). In one implementation, firewall 210 may create a cookie including data associated with the specific client 110 sending the SYN packet. For example, in creating the cookie, firewall 210 may calculate an initial sequence number (ISN) and generate a particular signature to use for the ISN in a SYN/ACK packet.

In another implementation, firewall 210 may generate the particular signature for the ISN in a different way. For example, firewall 210 may use information in a received message, including for example a SYN packet, such as the source IP address, a destination IP address, a source port number, a destination port number, and/or an ISN, to generate the particular signature. In one implementation, firewall 210 may generate the particular signature by hashing the information in the received message.

A SYN/ACK packet may be sent to client 110 (block 515). In one implementation, firewall 210 may prepare a SYN/ACK packet on behalf of application server 150. For example, firewall 210 may send the SYN/ACK packet to client 110 by outputting the SYN/ACK packet on a link for transmission toward client 110. Firewall 210 receives a responsive TCP ACK packet from client 110 (block 520). After receiving the responsive TCP ACK packet from the client, firewall 210 may determine whether an application ACK is required (block 525). In one implementation firewall 210 may obtain information related to application server 150 and application 160 from server profile database 450, to determine whether an application ACK is required. For example, application 160 may be an e-mail application resident in application server 150. Further in the example, application server 150 may operate e-mail application 160 as a POP3 server. In this example, application server 150 may be vulnerable to a potential DDoS attack, such as from transmissions from multiple clients 110, where the clients 110 are not transmitting in POP3. In this example, application server 150 would require protection from a DDoS attack that includes SYN packets and/or ACK packets using a transmission protocol not supported by application server 150.

Assume that firewall 210 has determined that an application ACK packet is required to protect server 140 and application 160 (block 525—YES). Firewall 210 may send an application ACK to client 110 (block 530). In one implementation, an application ACK may be considered a fake ACK message, designed to trigger a service request from client 110. For example, firewall 210 may send an application ACK to client 110 before initiating a three-way handshake process with application server 150. After sending an application ACK to client 110, firewall 210 may receive a responsive service request from client 110 (block 535). For example, client 110, upon receiving the application ACK message, may generate a service request with a data pattern conforming to the capabilities and/or requirements of application server 150, as provided by client 110. In the case of a client 110 that has accessed a poisoned index table, client 110 may be sending a service request that is incompatible with the profile of application server 150 and/or application 160. Client 110 may transmit the service request to application server 150, and firewall 210 may intercept the service request.

Firewall 210 may determine that application 160 resident on application server 150 does not require sending an application ACK to client 110 (block 525—NO). In one implementation, firewall 210 may do nothing and may wait for a service request from client 110.

Upon receiving a service request from client 110, firewall 210 may determine if the service requested by client 110 matches the service provided by application server 150 and application 160 (block 540). In one implementation, firewall 210 may check the context, including data pattern and/or transmission protocol, of the TCP ACK received from client 110, to determine if the service request context or data pattern matches the context or data pattern provided by application 160 at application server 150. In one implementation, firewall 210 may obtain context and/or data pattern information related to application server 150 and application 160 from server profile database 450. In another implementation, context and/or data pattern information related to application server 150 and application 160 may be stored in the TCP stack on application server 150. For example, application server 150 may include a hook pointer in a TCP stack that may direct firewall 210 to the location and content required to determine whether an application ACK is required to protect application server 150.

If firewall 210 determines that the service request from client 110 does not match the context and/or requirements of application server 150 and/or application 160, (block 540—NO), firewall 210 may drop the packet, including the SYN packet received in block 505 and/or the ACK packet received in block 520. In one implementation, dropping the packet may free the cookie created in block 510. In another implementation, if firewall 210 determines that the service request from client 110 does not match the context and/or requirements of application server 150 and/or application 160 (block 540—NO), firewall 210 may terminate the connection with client 110.

If firewall 210 determines that the service request from client 110 matches the context and/or requirements of application server 150 and/or application 160 (block 540—YES), firewall 210 may begin a 3-way handshake with application server 150. For example, firewall 210 may send a SYN packet to application server 150 (block 545). Firewall 210 may also send a SYN packet to application server 150 (block 545) if firewall 210 has determined that an application ACK is not required (block-525—NO). In either example firewall 210 may generate a SYN packet and include, in the SYN packet, information that firewall 210 obtained through the three-way handshake and application ACK/service request analysis that firewall 210 performed with client 110. In another example firewall 210 may include in the SYN packet information programmed into the firewall. In one implementation, the SYN packet may include sufficient information regarding client 110 to permit the SYN packet to appear to the server as if the SYN packet was sent from client 110. Firewall 210 may send the SYN packet to application server 150 by outputting the SYN packet on a link for transmission toward application server 150.

Firewall 210 may receive a SYN/ACK packet from application server 150 (block 550). For example, application server 150 may, upon receiving the SYN packet, generate a SYN/ACK packet that application server 150 may send to client 110. Firewall 210 may intercept the SYN/ACK packet. Receipt of the SYN/ACK from application server 150 may indicate that application server 150 has accepted the connection.

Firewall 210 may send an ACK packet to application server 150 (block 555). For example, upon receipt of the SYN/ACK packet, firewall 210 may generate an ACK packet that firewall 210 may send to application server 150 to continue the TCP connection set-up. After sending an ACK packet to application server 150, firewall 210 may determine if an application ACK was sent to client 110 in block 525 (block 560). If firewall 210 determines that an application ACK was sent to client 110 in block 525 (block 560—YES), firewall 210 may receive an application ACK from application server 150 (block 565).

Upon receipt of application ACK from application server 150, firewall 210 may establish a TCP connection between client 110 and application server 150 (block 570). Firewall 210 may also establish a TCP connection between client 110 and application server 150 after determining that no application ACK was sent in block 525 (block 560—NO).

Example

Figure 6:
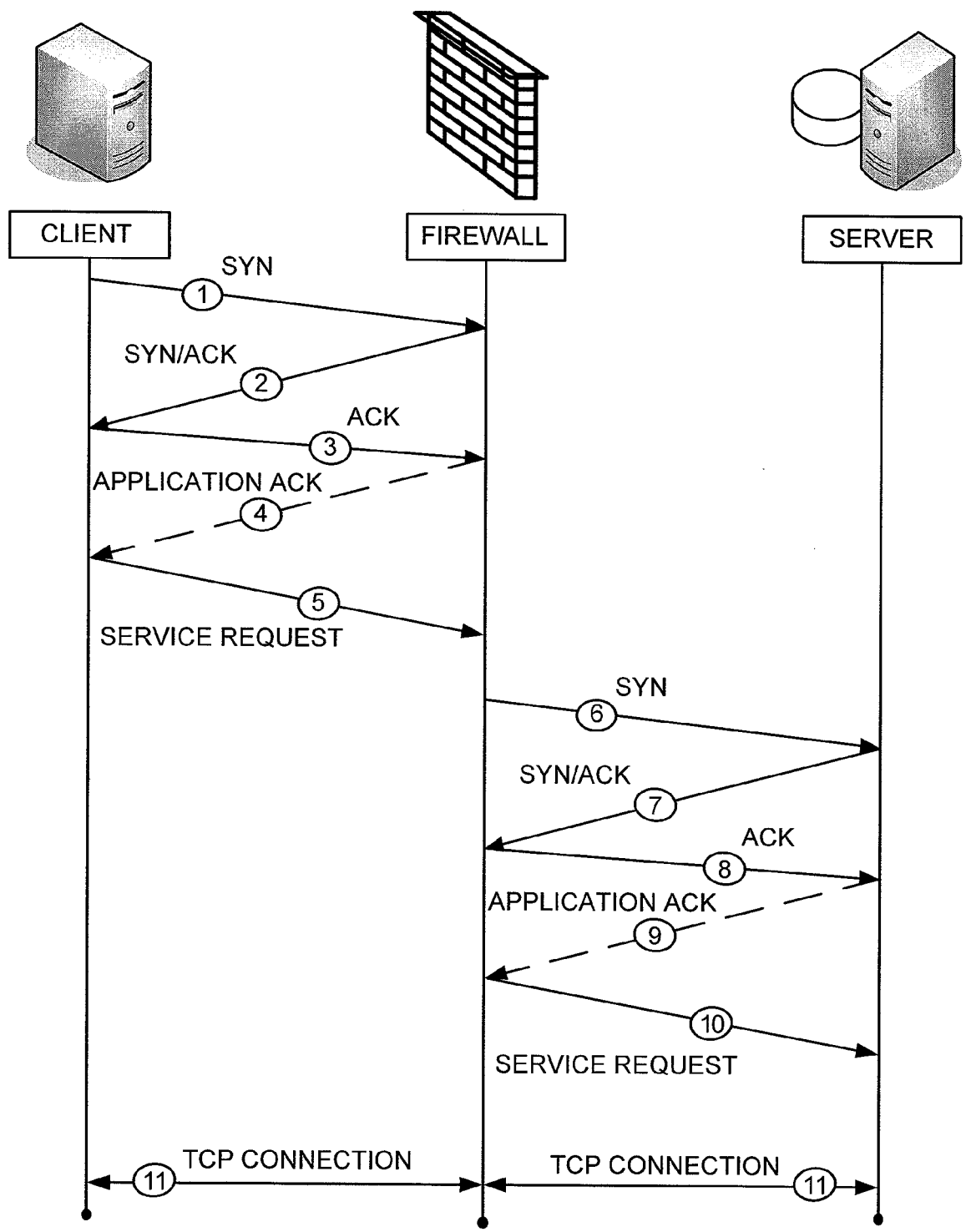
FIG. 6 is a diagram illustrating an example of establishing a TCP connection.

FIG. 6 is a diagram illustrating an example of establishing a TCP connection between a client and a server. As shown in FIG. 6, assume that a client desires to establish a TCP connection with a server, and the server is protected by a firewall. The client may generate a SYN packet and transmit the SYN packet to the server (as shown at (1)). The SYN packet may be intercepted by the firewall. The firewall may determine that the SYN packet is associated with a request for a new TCP connection. The firewall may initiate a SYN cookie operation to generate a particular signature for the ISN. The firewall may generate a SYN/ACK packet that includes the ISN, and transmit the SYN/ACK packet to the client (as shown at (2)).

The client may receive the SYN/ACK and generate an ACK message. The client may send the ACK packet to the server. The ACK packet may be intercepted by the firewall (as shown at (3)). The firewall may process the ACK packet and generate and send an application ACK to send to the client, if the firewall determines that the server requires protection. For example, if the server is hosting an e-mail application as a POP3 server, the firewall may determine that an application ACK should be generated and sent to the client, in order to verify that the service request includes POP3 protocol.

The firewall may generate an application ACK packet that the firewall may send to the client (as shown at (4)). The client may receive the application ACK from the firewall, and send a service request (as shown at (5)). For example, the service request from the client may include a request for e-mail service from the application server. The firewall may receive the service request from the client. The firewall may analyze the service request to determine if the service request matches the application requirements of the server. For example, the server may operate an e-mail application as a POP3 server. In this example, the firewall may analyze the service request to determine that the transmission protocol of the service request includes POP3. Assume that the firewall determines that the service request matches the application requirements of the server.

The firewall may send the SYN packet to the server (as shown at (6)). Assume that the server accepts the connection request. As a result, the server may generate a SYN/ACK packet that the server may send to the client. The SYN/ACK packet may be intercepted by the firewall (as shown at (7)). The firewall may send an ACK packet to the server (as shown at (8)).

The firewall may wait for an application ACK from the server (as shown at (9)). Upon receipt of the application ACK from the server, the firewall may forward the service request from the client to the server (as shown in (10)). After forwarding the service request from the client to the server, the firewall may establish a TCP connection between the client and the server (as shown in (11)).

CONCLUSION

Implementations, described herein, may improve protection of servers operating in a P2P network employing TCP communications, through improved operation of a firewall. After performing a three-way handshake with a client, the firewall may send an application cookie to the client, to initiate a service request from the client. As a result, when the client sends an initial transmission including a service request, the firewall may inspect the service request. The firewall may operate to ensure that the service request conforms to the capabilities of the server, and drop the service request if it does not conform, thereby reducing the chance that the service request is part of a distributed denial of service attack.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIG. 5-6, the order of the blocks may be modified in other implementations. Further, non-dependent blocks may be performed in parallel.

Further, while the terms "client" and "server" have been used to refer to devices, these terms may also refer to applications operating on these devices. The terms "client device" and "server device" are intended to refer to devices and not to applications operating on these devices.

It will be apparent that aspects described herein may be implemented in many different forms of software, firmware, and hardware in the implementations illustrated in the figures. The actual software code or specialized control hardware used to implement these aspects does not limit the embodiments described herein. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, connected between a client and a server, the device comprising:
   a memory to store a plurality of records, one of the records including information regarding an application operating on the server, the information including a transmission protocol associated with the application; and
   a processor, implemented at least partially in hardware and connected to the memory, to:
      intercept a first message, from the client, intended for the server;
      generate a second message based on the first message;
      send the second message to the client;
      receive a third message from the client;
      access the memory, based on the third message, to identify the transmission protocol associated with the application;
      determine that the identified transmission protocol associated with the application matches information contained in the third message;
      generate, based on determining that the information contained in the third message matches the identified transmission protocol associated with the application, a fourth message;
      send the fourth message to the client;
      receive a service request from the client based on the fourth message,
      establish, based on the service request, a connection between the client and the server,
      the processor, when establishing the connection, being to:
         transmit a fifth message to the server;
         receive a sixth message from the server;
         transmit a seventh message to the server;
         receive an eighth message from the server; and
         forward the service request from the client to the server, based on the eighth message, to establish the connection.

2. The device of claim 1, where the first message is a synchronization (SYN) message, the second message is a synchronization (SYN)/acknowledgment (ACK) (SYN/

ACK) message, the third message is an ACK message, and the fourth message is an application ACK message.

3. The device of claim 1, where the information, stored in the memory, regarding the application operating on the server includes a value regarding at least one of the transmission protocol, a server protocol, a data pattern, or an application keyword.

4. The device of claim 1, where the device is a firewall connected between the client and the server.

5. The device of claim 1, where the fifth message is a synchronization (SYN) message, the sixth message is a synchronization (SYN)+acknowledgment (ACK) (SYN/ACK) message, and the seventh message is an ACK message.

6. The device of claim 1, where the device connects to a plurality of servers, and where each of the records, in the memory, stores information regarding an application operating on one of the plurality of servers.

7. The device of claim 1, where the device further includes:
a transmission control protocol (TCP) stack; and
a hook pointer provided by the TCP stack, that directs the processor to locate information regarding the application operating on the server.

8. A method comprising:
storing, by a device and in a memory, information regarding an application operating on a server, the information including a transmission protocol associated with the application;
intercepting, by the device and from a client and over a network, a synchronization (SYN) message intended for the server;
generating, by the device, a SYN/acknowledgment (ACK) (SYN/ACK) message;
transmitting, by the device, the SYN/ACK message to the client;
receiving, by the device, an ACK message from the client over the network;
identifying, by the device and from the memory, the information regarding the application operating on the server;
generating, by the device and based on identifying the information regarding the application operating on the server, an application ACK message, that includes the information regarding the application operating on the server;
transmitting, by the device, the application ACK message to the client;
receiving, by the device, a service request from the client based on the application ACK message;
determining, by the device, whether to establish a connection between the client and the server based on the service request, the determining including:
accessing the memory, based on the received service request, to identify the transmission protocol associated with the application;
determining that the identified transmission protocol associated with the application matches information contained in the received service request; and
determining, based on determining that the information contained in the received service request matches the identified transmission protocol associated with the application, to establish the connection;
transmitting, by the device and based on determining to establish the connection, a second SYN message to the server;
receiving, by the device, a second SYN/ACK message from the server; and
transmitting, by the device, a second ACK message to the server to establish the connection between the client and the server.

9. The method of claim 8, where storing the information regarding the application operating on the server includes storing a value regarding at least one of the transmission protocol, a server protocol, a data pattern, or an application keyword.

10. The method of claim 8, where storing the information regarding the application operating on the server includes a hook pointer in a TCP stack.

11. The method of claim 8, where the method is performed by a firewall connected between the client and the server.

12. The method of claim 8, further comprising:
receiving a second application ACK message from the server;
forwarding the service request from the client to the server, based on the second application ACK message; and
determining whether to establish a connection between the client and the server based on the service request.

13. The method of claim 8, further comprising:
accessing a hook pointer that directs the device to locate information regarding the application operating on the server.

14. A non-transitory computer-readable medium containing instruction, the instructions comprising:
one or more instructions which, when executed by at least one processor of a device, cause the at least one processor to monitor information provided by the server during a three-way handshake;
one or more instructions which, when executed by the at least one processor, cause the at least one processor to store the information as information regarding an application operating on the server, the information including a transmission protocol associated with the application;
one or more instructions which, when executed by the at least one processor, cause the at least one processor to receive, from the client, a request to establish a connection with the server;
one or more instructions which, when executed by the at least one processor, cause the at least one processor to perform, on behalf of the server, a three-way handshake with the client;
one or more instructions which, when executed by the at least one processor, cause the at least one processor to generate, based on the information regarding an application operating on the server, an application acknowledgement (ACK) message;
one or more instructions which, when executed by the at least one processor, cause the at least one processor to transmit the application ACK message to the client, the information regarding the application operating on the server being provided in the application ACK message;
one or more instructions which, when executed by the at least one processor, cause the at least one processor to receive a service request from the client, based on the application ACK message;
one or more instructions which, when executed by the at least one processor, cause the at least one processor to access a memory, based on the received service request, to identify the transmission protocol associated with the application;
one or more instructions which, when executed by the at least one processor, cause the at least one processor to determine that the identified transmission protocol associated with the application matches information contained in the received service request;

one or more instructions which, when executed by the at least one processor, cause the at least one processor to perform, based on determining that the information contained in the received service request matches the identified transmission protocol associated with the application, a three-way handshake with the server when the three-way handshake with the client is successful;

one or more instructions which, when executed by the at least one processor, cause the at least one processor to forward the service request to the server; and one or more instructions which, when executed by the at least one processor, cause the at least one processor to establish the connection between the client and the server based on the service request, the one or more instructions to establish the connection including:

one or more instructions to transmit a synchronization (SYN) message to the server;

one or more instructions to receive a SYN/acknowledgment (ACK) (SYN/ACK) message from the server; and one or more instructions to transmit an ACK message to the server to establish the connection.

15. The medium of claim 14, where the three-way handshake with the client includes a SYN message, a SYN/ACK message, and an ACK message.

16. The medium of claim 14, where the information regarding the application operating on the server includes a value regarding at least one of a transmission protocol, a server protocol, a data pattern, or an application keyword.

17. The medium of claim 14, where the device is a firewall connected between the client and the server.

18. The medium of claim 14, where the device connects to a plurality of servers.

19. The medium of claim 18, where the memory stores information regarding an application operating on one of the plurality of servers.

20. The medium of claim 14, where the device further includes:

a transmission control protocol (TCP) stack; and a hook pointer provided by the TCP stack, that directs the processor to locate information regarding the application operating on the server.

* * * * *